(12) United States Patent
Trampe

(10) Patent No.: US 6,470,972 B1
(45) Date of Patent: Oct. 29, 2002

(54) GARDENING TOOL

(75) Inventor: Leslie O. Trampe, 12511 Hillview Dr., St. Louis, MO (US) 63138

(73) Assignees: Leslie O. Trampe, St. Louis, MO (US); Irene L. Trampe, St. Louis, MO (US); Trustees for Trampe Living Trust ( * ) Notice: Subject to any disclaimer, the term of this patent is extended or adjusted under 35 U.S.C. 154(b) by 0 days.

(21) Appl. No.: 09/682,192

(22) Filed: Aug. 3, 2001

(51) Int. Cl.$^7$ ............................................. A01B 1/00
(52) U.S. Cl. ......................................... 172/378; 7/114
(58) Field of Search ..................... 172/371, 375, 172/378, 380, 381, 41; 7/114, 116; D8/10, 11; 30/171

(56) References Cited

U.S. PATENT DOCUMENTS

| | | | | |
|---|---|---|---|---|
| 1,890,273 A | * | 12/1932 | Wells | |
| 2,066,803 A | * | 1/1937 | Sawyer | |
| 2,525,226 A | * | 10/1950 | Lawellin | |
| D199,019 S | * | 8/1964 | Marson | |
| 3,181,620 A | * | 5/1965 | Lowery | |
| 3,608,644 A | * | 9/1971 | Ambrose | |
| 3,680,834 A | * | 8/1972 | Holloway | |
| 3,813,081 A | * | 5/1974 | Alger | |
| 3,847,226 A | * | 11/1974 | Long | |
| 4,177,864 A | * | 12/1979 | Donnini | |
| D300,714 S | * | 4/1989 | Skibell | |
| 5,060,997 A | * | 10/1991 | Plecki | |
| D333,597 S | * | 3/1993 | Davis | |
| 5,244,241 A | * | 9/1993 | Lee | |
| D352,220 S | * | 11/1994 | Schroeder | |
| 5,695,172 A | * | 12/1997 | Hreha | |
| D442,840 S | * | 5/2001 | Waddell | |

FOREIGN PATENT DOCUMENTS

| | | | | |
|---|---|---|---|---|
| CH | 202184 | * | 1/1939 | ................. 172/371 |
| DE | 3536055 | * | 4/1987 | ................. 172/371 |
| GB | 2122063 | * | 1/1984 | ................. 172/371 |
| GB | 2187371 | * | 9/1989 | |
| GB | 2244901 | * | 12/1991 | ................. 172/371 |

* cited by examiner

Primary Examiner—Victor Batson
(74) Attorney, Agent, or Firm—Blumenfeld, Kaplan & Sandweiss, P.C.

(57) ABSTRACT

A garden tool is shown that has the compactness and general shape of a conventional straight shaft weeder. However, certain angles are formed in the shaft to facilitate easier use, particular by those with limited flexibility.

13 Claims, 1 Drawing Sheet

GARDENING TOOL

BACKGROUND OF INVENTION

1. Field of the Invention

The present invention relates to garden tools and more particularly to a garden tool for weeding with a multiple-angled blade.

2. Description of the Prior Art

It is well known to any gardener that for your crops to grow healthily it is vital to keep the growing area free of weeds. This can often be a difficult and cumbersome task. Many do not wish to use herbicides in the proximity of edible plants, either for fear that the herbicide will kill the desirous plant or the chemical will contaminate the food growing therefrom, or both.

Several tools have been devised to assist the gardener in the manual removal of weeds and aeration of the soil. Some of these tools are large and cumbersome and thus unsuitable for use around the perimeter of delicate plants. There is a type of weeding tool that comprises a short handle, a predominantly straight metal shaft protruding therefrom, and pair of sharpened teeth integrated with the termination of the shaft. Such a tool is made by Wallace Manufacturing Company of Enfield, Conn. and sold as Weeder #7046 (hereinafter referred to as a "Wallace-type weeder"). Wallace-type weeders are well-known in the art of gardening and the inventor will assume that the reader is generally familiar therewith. It is, of course, well-known that others manufacture similar tools of this type.

While the Wallace-type weeder is useful in that it is sufficiently compact so as not to disturb the desirous plants, the straight shaft and blade sometimes makes it inefficient at removing weeds or aerating the soil. Furthermore, many gardeners are senior in age, having taken up the activity as a hobby in retirement years. For this class of individuals, it is sometimes difficult to bend or arthritis makes using conventional weeders more difficult.

Thus, there is a need for a weeder shaped to be easy to use for people with compromised mobility, while still maintaining a compact package. It is an object of this invention to provide such a compact and easy-to-use garden tool for weeding and aerating the soil. Other objects will become apparent in light of the description that follows.

It is a further object of the present invention to provide such a tool with either a short handle for use from a sitting or kneeling position; or a long handle for use from a standing position.

SUMMARY OF INVENTION

It is with the above objects in mind that the present invention was created. The present invention takes a conventional Wallace-type weeder and modifies the straight shaft. The shaft is bent with at least two primary bends so that the end of the tool is somewhat facing the user.

The invention is easily understood and practiced as it can be made by starting with a Wallace-type weeder and using a blow torch or other conventional means of bending steel, providing the appropriate bends. The end of the Wallace-type weeder has a pair of sharpened teeth for penetrating the ground. The present invention does not modify this end, and these teeth should be facing back at the user, offset by 45 degrees when the user holds handle straight out and perpendicular to his body.

BRIEF DESCRIPTION OF DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted however, that the appended drawings illustrate only a typical embodiment of this invention and is therefore not to be considered limiting of its scope, for the invention may admit to other equally effective embodiments. Reference the appended drawings, wherein.

DETAILED DESCRIPTION

Figure 1:
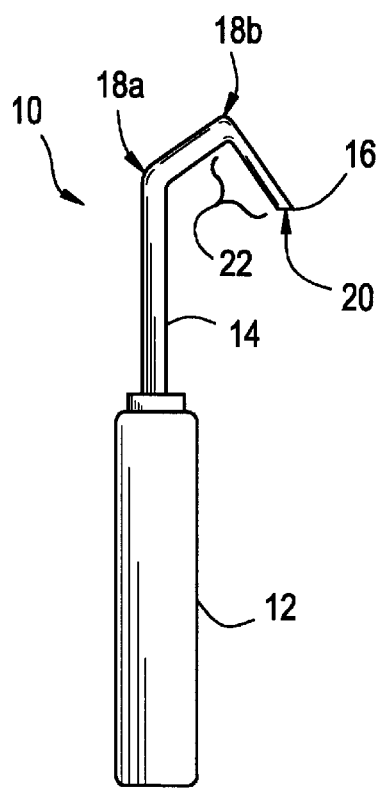
FIG. 1 is a side view of the garden tool of the present invention.
Figure 2:
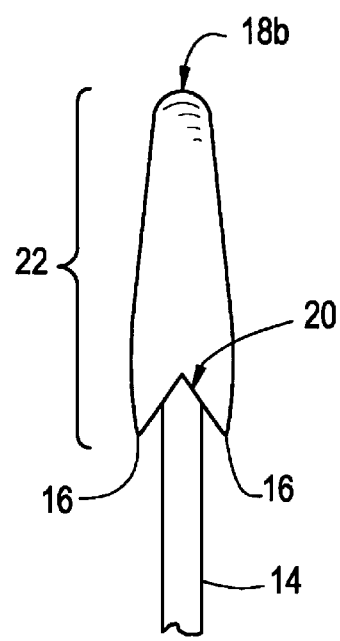
FIG. 2 is front view close-up of the end of the tool of FIG. 1.
Figure 3:
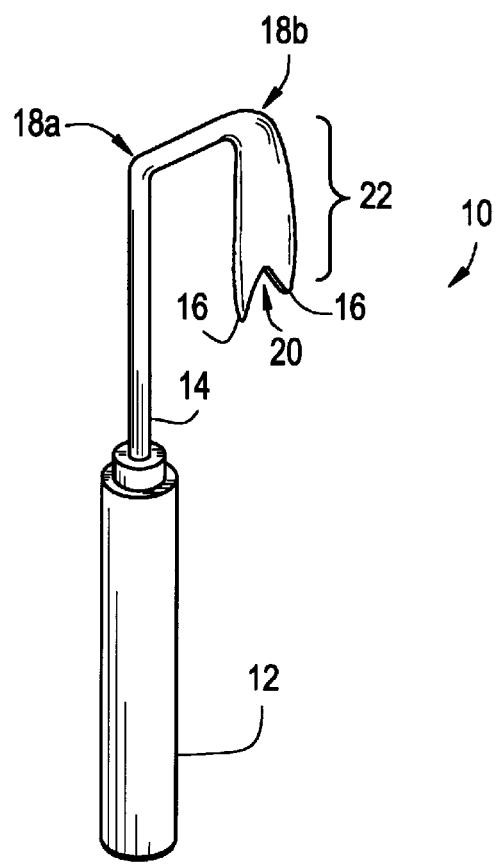
FIG. 3 is an isometric view of the tool of FIG. 1.

Referring now to FIG. 1, the garden tool 10 is shown generally. It comprises a handle 12, and a shaft 14, which culminates in a set of teeth 16 at the end distal from the handle 12. The general design of the handle and shaft are similar or identical to a Wallace-type weeder.

A plurality of angles 18 are formed in the shaft 14, such that the teeth 16 become generally facing the user holding the handle in a normal fashion. As is generally known, a Wallace-type weeder has a typically straight shaft where the teeth are facing away from the user and the user must have particular flexibility in the carpal joints to use if effectively.

While the number and precise magnitude of the angles 18 may vary, the preferred embodiment shown as two angles 18a and 18b. The distal angle 18b is preferably located very close to the teeth and is approximately a 90 degree angle. The proximal angle 18a located between one and three inches in from the distal angle 18b and approximately 45 degrees from the projected axis of the shaft. Thus the overall shaft design of the preferred embodiment yields teeth that are predominantly facing the user, offset from the handle by a net 45 degree angle.

It should also be noted that the section 22 of shaft 14 immediately adjacent teeth 16 is flattened and preferably sharpened on the trailing edge 20. While the drawings show a single preferred embodiment of the teeth, it should be readily apparent that the angle and width of the teeth may vary as can be found in different models of a conventional Wallace-type weeder. Additionally, the distinct angles 18 in the shaft may be replaced by a shaft having one continuous bend (the equivalent of an infinite number of angles) such that the teeth are predominantly facing the user. Thus the effect is comparable to that of the embodiment shown in the Figures.

In an alternate embodiment of the present invention, the conventional Wallacetype weeder handle 12 (5" to 10" in length) can be replaced with a much longer handle (several feet in length). This will permit the same tool to be used from a standing position by those who cannot or do not want to sit or kneel while gardening.

While the foregoing is directed to the preferred embodiments of the present invention, other and future embodiments of the invention may be devised without departing from the basic scope thereof, and the scope thereof is determined by the claims which follow.

What is claimed is:

1. A gardening tool comprising:

a handle adapted to be held by a user of the tool;

a shaft protruding form said handle;

a plurality of teeth on an end of said shaft furthest from said handle;

said teeth being sharpened to pronounced points; and a plurality of bends formed in said shaft such that said teeth are predominantly facing the user holding said handle outward during use, wherein the teeth are oriented at an angle offset from said handle, the angle being substantially 45 degrees.

2. The gardening tool of claim 1, further comprising a flattened portion of said shaft immediately adjacent to said teeth.

3. The gardening tool of claim 2, wherein an edge of said flattened portion located between said teeth is sharpened.

4. The gardening tool of claim 1, comprising exactly two teeth.

5. The gardening tool of claim 1, comprising exactly two bends.

6. The gardening tool of claim 1, wherein said handle is between five and ten inches in length.

7. The gardening tool of claim 1, wherein said handle is greater than three feet in length.

8. A gardening tool comprising:

a handle adapted to be held by a user of the tool;

a shaft protruding from said handle;

a plurality of teeth on an end of said shaft furthest from said handle;

said teeth being sharpened to pronounced points; and wherein said shaft is curved such that said teeth are predominantly facing the user holding said handle outward during use, wherein the teeth are oriented at an angle offset from said handle, the angle being substantially 45 degrees.

9. The gardening tool of claim 8, further comprising a flattened portion of said shaft immediately adjacent to said teeth.

10. The gardening tool of claim 9, wherein an edge of said flattened portion located between said teeth is sharpened.

11. The gardening tool of claim 8, comprising exactly two teeth.

12. The gardening tool of claim 8, wherein said handle is between five and ten inches in length.

13. The gardening tool of claim 8, wherein said handle is greater than three feet in length.

\* \* \* \* \*